(12) United States Patent
Zheng et al.

(10) Patent No.: US 12,134,212 B2
(45) Date of Patent: Nov. 5, 2024

(54) CHARGING BARREL OF INFRARED DEHUMIDIFICATION, CRYSTALLIZATION AND DRYING ALL-IN-ONE MACHINE AND CRYSTALLIZATION AND DRYING ALL-IN-ONE MACHINE

(71) Applicant: Zhangjiagang Lianda Machinery Co., LTD, Jiangsu (CN)

(72) Inventors: Yong Zheng, Suzhou (CN); Xueming Pan, Suzhou (CN)

(73) Assignee: ZHANGJIAGANG LIANDA MACHINERY CO., LTD, Jinfeng (CN)

( * ) Notice: Subject to any disclaimer, the term of this patent is extended or adjusted under 35 U.S.C. 154(b) by 607 days.

(21) Appl. No.: 17/488,967

(22) Filed: Sep. 29, 2021

(65) Prior Publication Data
US 2022/0161460 A1 May 26, 2022

(30) Foreign Application Priority Data

Nov. 26, 2020 (CN) .......................... 202011351474.2
Jan. 19, 2021 (CN) .......................... 202110067361.8

(51) Int. Cl.
*B29B 13/06* (2006.01)
(52) U.S. Cl.
CPC ................. *B29B 13/065* (2013.01)
(58) Field of Classification Search
CPC ......... F26B 21/00; F26B 23/00; B29B 13/065
USPC ........................................................ 34/266
See application file for complete search history.

(56) References Cited

U.S. PATENT DOCUMENTS

| | | | | |
|---|---|---|---|---|
| 827,471 A * | 7/1906 | Shrady et al. | ........... | B27M 3/20 144/53 |
| 2,377,413 A * | 6/1945 | Fry | ........................ | G07F 11/10 192/100 |
| 3,180,072 A * | 4/1965 | Rapp | ...................... | B01D 53/26 96/120 |
| 5,016,362 A * | 5/1991 | Nakamura | ............. | A23N 12/10 34/558 |
| 6,079,118 A * | 6/2000 | Kiyokawa | ............... | F26B 17/20 34/139 |

(Continued)

FOREIGN PATENT DOCUMENTS

| | | |
|---|---|---|
| CN | 201059850 | 5/2008 |
| CN | 201062918 | 5/2008 |

(Continued)

*Primary Examiner* — Stephen M Gravini
(74) *Attorney, Agent, or Firm* — Renner, Kenner, Greive, Bobak, Taylor & Weber

(57) ABSTRACT

Disclosed is a charging barrel of an infrared dehumidification, crystallization and drying all-in-one machine and a drying machine. The cross section of the charging barrel is in the shape of a polygon, and the side number of the polygon is larger than the side number of a pentagon; an opening is formed in one end, as a feeding end, of the charging barrel; each plate surface forming the polygonal charging barrel comprises a middle plate part, as well as a first closing-up plate part and a second closing-up plate part which are arranged at the two ends of the middle plate part; the first closing-up plate part and the second closing-up plate part form obtuse angles with the middle plate part and are closed up towards the middle; a discharge hole is formed in the side wall of the charging barrel.

13 Claims, 14 Drawing Sheets

(56) References Cited

U.S. PATENT DOCUMENTS

| | | | |
|---|---|---|---|
| 6,560,893 B1 | 5/2003 | Bakalar | |
| 7,043,855 B2 * | 5/2006 | Heilman | D06F 58/30 |
| | | | 34/389 |
| 8,444,923 B2 * | 5/2013 | Persinger | B29B 13/065 |
| | | | 264/102 |
| 11,512,898 B2 * | 11/2022 | Gebhard | F26B 5/06 |
| 2014/0166555 A1 * | 6/2014 | Dibel | B01D 61/146 |
| | | | 210/90 |
| 2015/0150270 A1 * | 6/2015 | Barnett | A21B 1/245 |
| | | | 34/443 |
| 2017/0051974 A1 * | 2/2017 | Moarn | F26B 25/22 |
| 2018/0118882 A1 * | 5/2018 | Hagen | B29B 7/823 |
| 2022/0161460 A1 * | 5/2022 | Zheng | B29B 13/065 |

FOREIGN PATENT DOCUMENTS

| | | | | |
|---|---|---|---|---|
| CN | 104044226 | | 9/2014 | |
| CN | 106288696 | | 1/2017 | |
| CN | 211625944 | | 10/2020 | |
| CN | 112622091 | | 4/2021 | |
| CN | 112622091 A | * | 4/2021 | ............ B29B 13/065 |
| EP | 2764308 B1 | * | 9/2016 | ............ F26B 11/026 |
| GB | 2069674 | | 8/1981 | |
| JP | 5537547 B2 | * | 7/2014 | ............ B29B 13/065 |
| TW | 202220816 A | * | 6/2022 | ............ B29B 13/065 |
| WO | 2006126065 | | 11/2006 | |
| WO | WO-2013050158 A1 | * | 4/2013 | ............ F26B 11/026 |
| WO | WO-2022156259 A1 | * | 7/2022 | ............ B29B 13/065 |

* cited by examiner

CHARGING BARREL OF INFRARED DEHUMIDIFICATION, CRYSTALLIZATION AND DRYING ALL-IN-ONE MACHINE AND CRYSTALLIZATION AND DRYING ALL-IN-ONE MACHINE

CROSS REFERENCE TO RELATED APPLICATION(S)

This patent application claims the benefit and priority of Chinese Patent Application No. 202011351474.2, filed on Nov. 26, 2020, and Application No. 202110067361.8, filed on Jan. 19, 2021, the disclosure of which is incorporated by reference herein in its entirety as part of the present applications.

TECHNICAL FIELD

The present disclosure relates to a charging barrel of an infrared dehumidification, crystallization and drying all-in-one machine, and also relates to the infrared dehumidification, crystallization and drying all-in-one machine using the charging barrel.

BACKGROUND ART

In order to improve the quality of plastic products, raw materials are generally processed into plastic particles. Loose plastic particles are easily damped when exposed to air. Therefore, loose plastic particles need to be dried before being processed into plastic products, and a common method is that heat of a heater is directly fed into a pile of loose raw materials through a pipeline by utilizing a cooling fan to dry the raw materials. The heat is diffused in the loose raw materials, the peripheral raw materials are heated later, and the raw materials are in close contact with one another, so that the contact area of the heat and the raw materials is reduced; and moreover, water vapor generated after the raw materials are heated cannot be discharged in time, so that the drying time is long, and energy waste is large. The applicant previously applied a plastic particle drying machine with the patent application number of 201410314528.6. In the patent application file, the applicant adopts an infrared short-wave lamp box as a heating source, plastic particles can be rapidly heated and dried. In the drying process, a charging barrel is rotary, the whole charging barrel is integrally cylindrical, and a plurality of material overturning plates are arranged in the charging barrel, so that uniform heat dissipation of the plastic particles can be achieved through material overturning of the charging barrel.

However, the plastic particle drying machine has the following disadvantages: firstly, the charging barrel of the drying machine is cylindrical, the material overturning effect of the cylindrical charging barrel in the rotating process is very poor, so that a plurality of material overturning plates need to be welded in the charging barrel, the manufacturing difficulty is increased, meanwhile, a cover plate is mounted at the position of a discharge hole of the charging barrel in a swinging mode, a driving mechanism is used for driving the cover plate to deflect, and the discharge hole is closed and opened; due to the fact that driving of the cover plate is achieved through the motor, and the motor needs to be fixed to the rotating charging barrel, leading to quite complex internal wiring.

Secondly, the rotation of a filter cartridge of an existing plastic particle drying machine is driven by a motor, and the filter cartridge generally slides axially and can be drawn out from the interior of a machine shell, so that the filter cartridge is convenient to clean and the maintain, and therefore, the motor is mounted to be drawn out from the interior of the machine shell together with the filter cartridge in a sliding manner; the other end of the whole plastic particle drying machine needs to be provided with other electrical components such as a fan, so that circuits are arranged at two ends of the equipment, internal wiring is complex, and potential safety hazards exist.

Finally, when an infrared lamp box of the existing plastic particle drying machine is heated, although lamp tubes face the material direction, heat generated by the lamp tubes is also conducted to the lamp box, so that plastic particles are heated and adhered to the lamp box when falling onto the lamp box, and the phenomenon of adhesion of the plastic particles on the lamp box is serious.

SUMMARY

One technical problem to be solved by the present disclosure is to provide a charging barrel of an infrared dehumidification, crystallization and drying all-in-one machine, and the charging barrel has a better material overturning effect under the condition that no material overturning plate exists and is low in machining difficulty.

The other technical problem to be solved by the present disclosure is to provide an infrared dehumidification, crystallization and drying all-in-one machine, and the drying machine uses the charging barrel, so that the material overturning effect is good.

In order to solve the technical problem, the present disclosure adopts the following technical schemes: according to a charging barrel of an infrared dehumidification, crystallization and drying all-in-one machine, the cross section of the charging barrel is in the shape of a polygon, and the side number of the polygon is larger than the side number of a pentagon; an opening is formed in one end, as a feeding end, of the charging barrel; each plate surface forming the polygonal charging barrel comprises a middle plate part, as well as a first closing-up plate part and a second closing-up plate part which are arranged at the two ends of the middle plate part; the first closing-up plate part and the second closing-up plate part form obtuse angles with the middle plate part and are closed up towards the middle; a discharge hole is formed in the side wall of the charging barrel or an opening in the other end of the charging barrel is set as a discharge hole; and when the opening in the other end of the charging barrel is set as the discharge hole, a spiral discharging guide plate facilitating discharging of materials is arranged in the charging barrel.

As a preferable scheme, the discharge hole in the side wall of the charging barrel is formed in the joint of the two adjacent plate surfaces, and one plate surface of the two adjacent plate surfaces deviates outwards to form the discharge hole.

As a preferable scheme, the inner wall of the charging barrel is provided with material overturning structures facilitating overturning of plastic particle.

As a preferable scheme, the material overturning structures comprises material overturning protrusions arranged on the first closing-up plate parts and the second closing-up plate parts.

As a preferable scheme, the material overturning structures further comprise at least one pair of material overturning plates arranged on the middle plate part, the material overturning plates are arranged in a splayed mode, and the orientation of the ends, close to each other, of the pair of material overturning plates is tangent to the working rotation direction of the charging barrel.

As a preferable scheme, the material overturning structures comprise a plurality of groups of material overturning plates which are arranged in parallel, the plate surface of the material overturning plate is intersected with the center line of the charging barrel to form an intersection angle, and each group of material overturning plates are arranged on the middle plate part.

After the technical scheme is adopted, the present disclosure has the advantages that according to the charging barrel of an infrared dehumidification, crystallization and drying all-in-one machine, the cross section of the charging barrel is in the shape of a polygon, and the side number of the polygon is larger than the side number of a pentagon; and an opening is formed in one end, as a feeding end, of the charging barrel, and a discharge hole is formed in the side wall of the charging barrel. Due to the fact that the charging barrel is of the polygonal structure, in the rotating process of the charging barrel, materials are overturned from one plate surface to another other plate surface, so that a material overturning effect is achieved, enough material overturning effect of the internal materials can be ensured without additionally arranging a material overturning plates, and the internal materials can be preferably heated; besides, each plate surface of the charging barrel comprises a middle plate part, as well as a first closing-up plate part and a second closing-up plate part which are arranged at the two ends of the middle plate part, and the first closing-up plate part and the second closing-up plate part form obtuse angles with the middle plate part and are closed up towards the middle, so that plastic particles can be prevented from falling off from openings in the two ends in the overturning process. At the same time, an inclined plate part can be formed by the closing-in structure, so that the materials can be overturned in the axial direction, and the material overturning effect is better. The discharge hole of the charging barrel can be the opening in the other end of the charging barrel. At the moment, a spiral discharging guide plate facilitating discharging of materials is arranged in the charging barrel. In this way, no opening exists in the barrel body of the charging barrel. The charging barrel rotates in the working process, and the rotation direction is opposite to the discharging rotation direction, so that internal materials cannot be guided out along with the spiral discharging guide plate, more viscous materials can be met. For example, in the production process of PET color master batches, when PET raw materials are crystallized, the materials are highly viscous after being heated. After the scheme is adopted, PET raw material ions cannot leak in the crystallization process in the charging barrel. Therefore, the influence on the subsequent production of the PET color master batches due to the mixing of the crystallized materials and the non-crystallized materials is avoided.

Moreover, the discharge hole of the charging barrel is formed in the joint of the two adjacent plate surfaces, one plate surface of the two adjacent plate surfaces deviates outwards to form the discharge hole, the discharge hole is easy to form, only one of the plate surfaces deviates outwards to form the discharge hole, the discharge hole does not need to be additionally provided with a cover plate, and switching between a working state and a discharging state can be achieved through forward rotation and overturning of the charging barrel, so that a cover plate and a motor for driving the cover plate are saved, the structure is simplified, internal wires are fewer, and the reliability is higher. In addition, preferably, the discharge hole is formed in the joint of the middle plate parts of the two adjacent plate surfaces, so that the discharge hole is formed in the joint of the middle plate parts due to the existence that the two ends are closed up, and the discharging is more thorough. Due to the adoption of the polygonal charging barrel, in the drying process of the materials, for some plastic particles with certain viscosity after being heated, even if the materials are adhered to the charging barrel and rotate to the uppermost end, the materials can fall off along the inclined plate surfaces and cannot vertically fall off, so that the probability that the materials leak out of the discharge hole in the working state is reduced.

Moreover, the material overturning structures comprise material overturning protrusions arranged on the first closing-up plate parts and the second closing-up plate parts, and the material overturning protrusions can overturn the materials on the first closing-up plate parts and the second closing-up plate parts to a certain degree, so that the material overturning effect is further improved.

Moreover, the material overturning structures further comprise at least one pair of material overturning plates arranged on the middle plate part, the material overturning plates are arranged in a splayed mode, and the orientation of the ends, close to each other, of the pair of material overturning plates is tangent to the working rotation direction of the charging barrel, so that the material overturning plates can be used for distributing the plastic particles in the axial direction. Therefore, the materials are overturned again.

Moreover, the material overturning structures comprise a plurality of groups of material overturning plates which are arranged in parallel, the plate surface of the material overturning plate is intersected with the center line of the charging barrel to form an intersection angle, and each group of material overturning plates are arranged on the middle plate part. The structure of the material overturning plate is more suitable for arranging the spiral discharging guide plate. It is assumed that forward rotation of the charging barrel is the working rotation direction and reverse rotation is the discharging rotation direction, in the normal crystallization process, the material overturning plates arranged in parallel can achieve material overturning, and when discharging is needed, the material overturning plates play a material guiding role. The materials move towards the discharge hole along the material overturning plates, then fall onto the rotary discharging guide plate and are finally discharged from the discharge hole. Through the material overturning mechanism, the discharging time of the plastic particles is short, the discharging is smoother and more thorough, and the materials in the charging barrel can be completely discharged.

In order to solve the second technical problem, the present disclosure adopts the following technical schemes: an infrared dehumidification, crystallization and drying all-in-one machine comprises a machine frame on which a machine shell is fixed, the charging barrel is rotatably mounted around the central axis on the machine frame, the charging barrel is driven by a motor to rotate, a feeding device is mounted on the machine shell and located on the side of a feeding hole of the charging barrel, a lamp box which extends into the charging barrel from the feeding hole and can emit infrared short waves to heat materials is mounted on the machine frame, a fan is further arranged on the machine frame, an exhaust pipe which communicates with the charging barrel and is used for exhausting air in the charging barrel is connected to the fan, and limiting devices for limiting the axial position of the charging barrel are arranged at the two ends of the charging barrel respectively.

When the discharge hole is formed in the side wall of the charging barrel, a discharging hole corresponding to the discharge hole in position is formed in the lower part of the machine shell.

And when the opening in the side wall of the charging barrel is the discharge hole, an outer cover for blocking the discharge hole is hinged to the machine frame, an opening and closing power device for driving the outer cover to be opened and closed is arranged on the machine frame, and a guide hopper is arranged below the discharge hole on the machine frame.

As a preferable scheme, the engine base comprises a fixed support frame and a sliding seat mounted on the engine base in an axial sliding mode, two pairs of support rollers are mounted on the sliding seat, rotary support structures facilitating rotation of the charging barrel are mounted on the periphery of the charging barrel, the charging barrel is rotatably mounted on the support rollers through the rotary support structures, the limiting devices are mounted on the sliding seat and limit the axial position of the charging barrel, one support roller of the two pairs of support rollers is a driving support roller, the motor is fixed to the engine base, an output shaft of the motor and a wheel shaft of the driving support roller are in transmission connection through a split type coupler.

As a preferable scheme, the lamp box comprises a box body, a lamp tube mounting cavity is formed in the bottom of the box body, a plurality of lamp tubes are mounted in the lamp tube mounting cavity in an arrayed mode, a heat insulation layer is pasted to the wall of the lamp tube mounting cavity, and an air cooling device for conducting air cooling on the lamp tubes is connected to the box body.

As a preferable scheme, a partition plate is arranged at the position, close to the feeding end of the charging barrel, of the fixed support frame, an end sealing piece and a heat insulation pad are fixed to the partition plate, the heat insulation pad is arranged between the box body and the partition plate, the end sealing piece comprises a mounting flange part mounted on the partition plate and a sealing protrusion part protruding towards the charging barrel, and the opening in the feeding end of the charging barrel is sleeved on the sealing protrusion part and is matched with the sealing protrusion part in a sealing manner.

As a preferable scheme, the opening and closing power device is an air cylinder, an air cylinder support is fixed to the sliding seat, the air cylinder is hinged to the air cylinder support, an end frame is arranged at the discharging end, close to the charging barrel, of the sliding seat, the middle of an uncovering lever is hinged to the end frame, one end of the uncovering lever is hinged to a piston cylinder of the air cylinder, and the outer cover is rotatably mounted at the other end of the uncovering lever through a bearing.

As a preferable scheme, the opening and closing power device is an air cylinder, an air cylinder support is fixed to the sliding seat, the air cylinder is mounted on the air cylinder support, an outer cover support is mounted on the sliding seat in an axial sliding mode, the outer cover is rotatably mounted on the outer cover support through a bearing, and the outer cover support is driven by the air cylinder.

After the technical schemes are adopted, the present disclosure has the following effects: an infrared dehumidification, crystallization and drying all-in-one machine comprises a machine frame on which a machine shell is fixed, the charging barrel is rotatably mounted around the central axis on the machine frame, the charging barrel is driven by a motor to rotate, a feeding device is mounted on the machine shell and located on the side of a feeding hole of the charging barrel, a lamp box which extends into the charging barrel from the feeding hole and can emit infrared short waves to heat materials is mounted on the machine frame, a fan is further arranged on the machine frame, an exhaust pipe which communicates with the charging barrel and is used for exhausting air in the charging barrel is connected to the fan, and limiting devices for limiting the axial position of the charging barrel are arranged at the two ends of the charging barrel respectively; when the discharge hole is formed in the side wall of the charging barrel, a discharging hole corresponding to the discharge hole in position is formed in the lower part of the machine shell; and when the opening in the side wall of the charging barrel is the discharge hole, an outer cover for blocking the discharge hole is hinged to the machine frame, an opening and closing power device for driving the outer cover to be opened and closed is arranged on the machine frame, and a guide hopper is arranged below the discharge hole on the machine frame. The infrared dehumidification, crystallization and drying all-in-one machine adopts the charging barrel, the charging barrel is driven by the motor to rotate, and plastic particles can roll better in the charging barrel. Meanwhile, the lamp box extends into the charging barrel to conduct infrared short-wave irradiation on the plastic particles to achieve infrared drying. In the drying process, moisture can be exhausted through the exhaust pipe, and the material overturning effect of the whole drying machine is good. In the drying process, due to the fact that the cross section of the charging barrel is in the shape of a polygon, and the side number of the polygon is larger than the side number of a pentagon, when the discharge hole is formed in the side wall of the charging barrel, if the viscosity of the plastic particles is not large, the plastic particles are difficult to adhere to the inner wall of the charging barrel, and therefore the situation of material leakage is avoided. When the viscosity of the plastic particles is large in the heating process, for example, raw materials of PET color master batches are likely to be adhered to the inner wall of the charging barrel during crystallization, the adhered particles are driven by the charging barrel to rotate to reach the highest point. If the lower part of the side wall just corresponds to the discharge hole at the moment, the plastic particles fall into the discharge hole when falling off, and finally material leakage is achieved. Nevertheless, after the polygonal charging barrel is adopted, more plastic particles roll down along the inner wall due to the polygonal inner wall when falling off, and compared with an existing structure, the probability of material leakage is reduced. However, when the crystallization and drying all-in-one machine adopts an end discharging mode, no matter how the plastic particles are adhered, material leakage is avoided, so that the problem of material leakage of the plastic particles with high viscosity is thoroughly solved, and the industrial pain point that crystallized particles and non-crystallized particles are easy to dope in the production process of PET color master batches is solved.

Moreover, the machine frame comprises a fixed support frame and a sliding seat mounted on the engine base in an axial sliding mode, two pairs of support rollers are mounted on the sliding seat, rotary support structures facilitating rotation of the charging barrel are mounted on the periphery of the charging barrel, the charging barrel is rotatably mounted on the support rollers through the rotary support structures, the limiting devices are mounted on the sliding seat and limit the axial position of the charging barrel, one support roller of the two pairs of support rollers is a driving support roller, the motor is fixed to the fixed support frame, an output shaft of the motor and a wheel shaft of the driving support roller are in transmission connection through a split type coupler, and the guide hopper is fixed on the sliding seat. Therefore, when the charging barrel needs to be moved out of the machine shell, the split type coupler can be separated, the charging barrel can be moved out, and the motor is directly fixed to the engine base and located at the other end, where the charging barrel is moved out, of the machine shell, so that all electrical equipment and components of the drying machine are conveniently placed at one end of the machine shell in a centralized mode, the internal circuit is simpler, and the reliability is higher. After the charging barrel is moved out, the interior of the charging barrel can be cleaned, and dehumidification, crystallization and drying of different materials are met.

Moreover, the lamp box comprises a box body, a lamp tube mounting cavity is formed in the bottom of the box body, a plurality of lamp tubes are mounted in the lamp tube mounting cavity in an arrayed mode, a heat insulation layer is pasted to the wall of the lamp tube mounting cavity, and an air cooling device for conducting air cooling on the lamp tubes is connected to the box body. Air can be supplied to the interior of the lamp box through the air cooling device, so that heat dissipation of the lamp tubes is achieved; and meanwhile, the heat insulation layer can achieve heat insulation, and heat transferred to the box body is reduced, so that even if the plastic particles fall onto the surface of the box body, the plastic particles cannot be adhered to the surface of the box body due to too high temperature.

Moreover, a partition plate is arranged at the position, close to the feeding end of the charging barrel, of the fixed support frame, an end sealing piece and a heat insulation pad are fixed to the partition plate, the heat insulation pad is arranged between the box body and the partition plate, the end sealing piece comprises a mounting flange part mounted on the partition plate and a sealing protrusion part protruding towards the charging barrel, and the opening in the feeding end of the charging barrel is sleeved on the sealing protrusion part and is matched with the sealing protrusion part in a sealing manner. After the structure is adopted, the heat insulation pad can divide heat transferred by the lamp box, and the sealing protrusion part of the end sealing piece can be plugged into the opening in the feeding end of the charging barrel and sealed, so that the plastic particles are prevented from splashing out of the feeding end.

Moreover, the opening and closing power device is an air cylinder, an air cylinder support is fixed to the sliding seat, the air cylinder is hinged to the air cylinder support, an end frame is arranged at the discharging end, close to the charging barrel, of the sliding seat, the middle of an uncovering lever is hinged to the end frame, one end of the uncovering lever is hinged to a piston cylinder of the air cylinder, and the outer cover is rotatably mounted at the other end of the uncovering lever through a bearing. By adopting the structure, the outer cover can be opened or closed through the uncovering lever by means of stretching and retracting of the air cylinder, meanwhile, the outer cover is mounted on the uncovering lever through the bearing, after closing, the outer cover can still rotate along with the charging barrel, so that splashing of the plastic particles is completely avoided.

BRIEF DESCRIPTION OF THE DRAWINGS

The description of the present disclosure is further described in conjunction with the attached figures and embodiments.

Reference signs in the attached figures: 1, charging barrel; 101, plate surface; 1011, middle plate part; 1012, first closing-up plate part; 1013, second closing-up plate part; 102, discharge hole; 103, material overturning protrusion; 104, material overturning plate; 105, spiral discharging guide plate; 2, machine frame; 21, fixed support frame; 22, sliding seat; 23, partition plate; 3, machine shell; 4, feeding device; 5, lamp box; 51, box body; 52, lamp tube mounting cavity; 53, lamp tube; 54, heat insulation layer; 6, exhaust pipe; 7, air cooling air supply pipe; 8, motor; 9, split type coupler; 91, female coupler; 911, groove; 92, male coupler; 921, protrusion; 10, limiting device; 101, mounting seat; 102, limiting roller; 11, support roller; 12, driving support roller; 13, rotary support structure; 14, outer cover; 15, guide hopper; 16, air cylinder; 17, end sealing piece; 171, mounting flange part; 172, sealing protrusion part; 18, heat insulation pad; 19, uncovering lever; 20, bearing; 210, air cylinder support; 211, outer cover support; 212, guide rod; and 213, guide sleeve.

DETAILED DESCRIPTION OF THE EMBODIMENTS

The present disclosure is further described in conjunction with the following specific embodiments.

Figure 1:
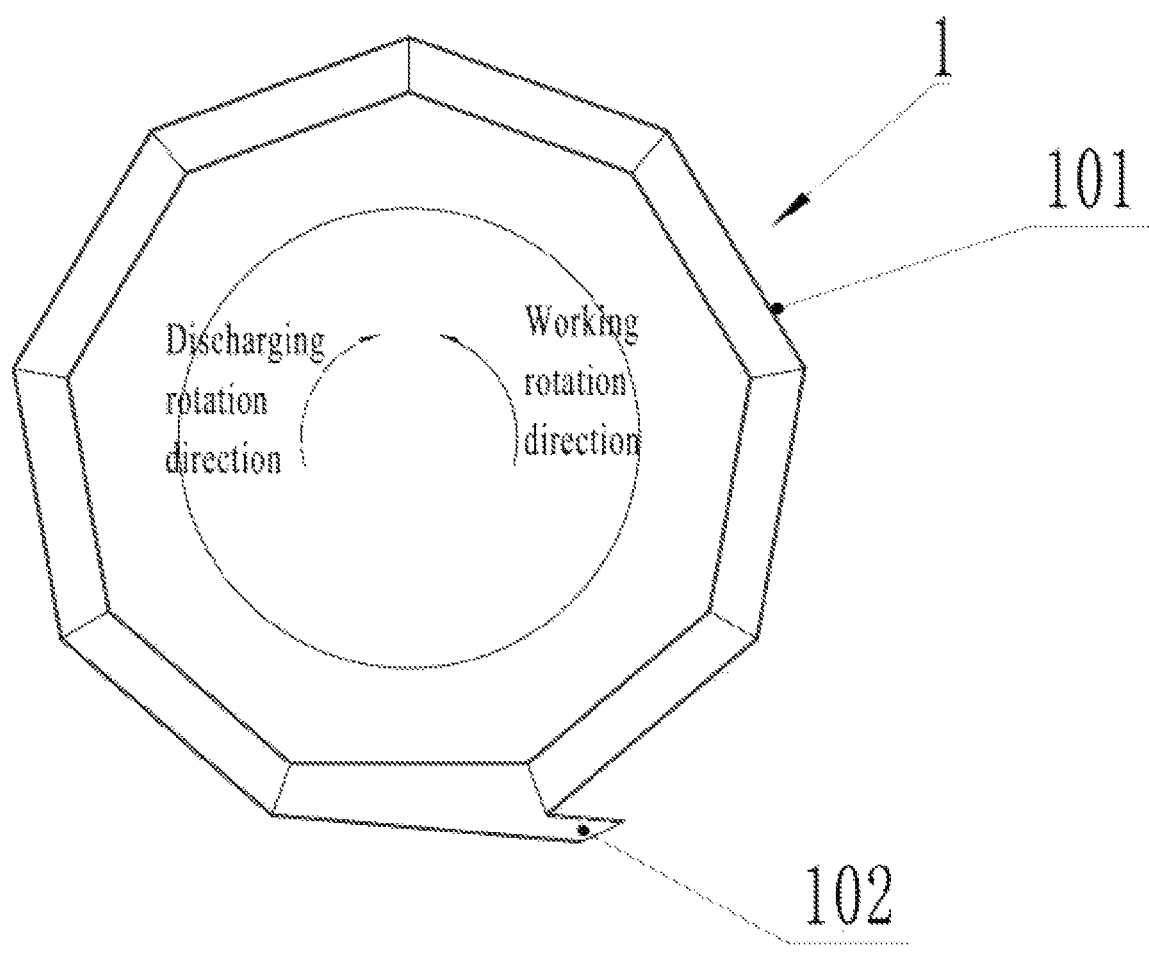
FIG. 1 is an end surface structural schematic diagram of a charging barrel in the first embodiment of the present disclosure.
Figure 2:
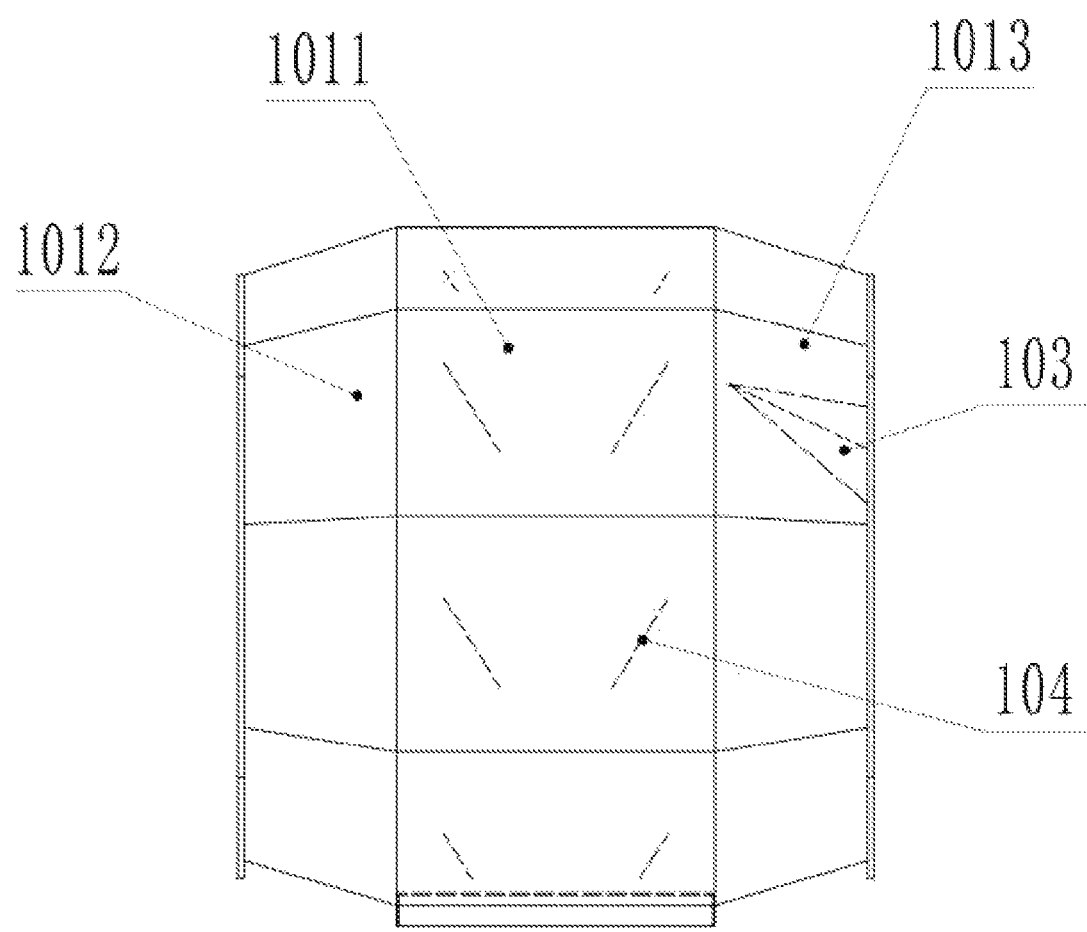
FIG. 2 is a left view of FIG. 1.

As shown in FIG. 2 to FIG. 2, according to a charging barrel 1 of an infrared dehumidification, crystallization and drying all-in-one machine, the cross section of the charging barrel 1 is in the shape of a polygon, and the side number of the polygon is larger than the side number of a pentagon, preferably, the polygon is one of pentagon to decagon, and an appropriate polygon is selected according to the size of the charging barrel 1; an opening is formed in one end, as a feeding end, of the charging barrel 1; each plate surface 101 forming the polygonal charging barrel 1 comprises a middle plate part 1011, as well as a first closing-up plate part 1012 and a second closing-up plate part 10213 which are arranged at the two ends of the middle plate part 1011; the first closing-up plate part 1012 and the second closing-up plate part 1013 form obtuse angles with the middle plate part 1011 and are closed up towards the middle; and a discharge hole 102 is formed in the side wall of the charging barrel 1. In the embodiment, the discharge hole 102 in charging barrel 1 is formed in the joint of the two adjacent plate surfaces 101, and one plate surface 101 of the two adjacent plate surfaces 101 deviates outwards to form the discharge hole 102. The discharge hole 102 is formed in the joint of the middle plate parts 1011 of the two adjacent plate surfaces 101.

Wherein, the plate surfaces 101 are welded and fixed to form a polygon, preferably a regular polygon. The plate surface 101 is a flat plate surface 101 which is bent to form a middle plate part 1011, a first closing-up plate part 1012 and a second closing-up plate part 1013; and the inner wall of the charging barrel 1 is provided with a material overturning structure facilitating overturning of plastic particles.

In the embodiment, the material overturning structures comprises material overturning protrusions 103 arranged on the first closing-up plate parts 1012 and the second closing-up plate parts 1013. The material overturning protrusions 103, which are triangular conical protrusions 921, are also welded and fixed. The material overturning structures further comprise at least one pair of material overturning plates 104 arranged on the middle plate part 1011, the material overturning plates 104 are arranged in a splayed mode, and the orientation of the ends, close to each other, of the pair of material overturning plates 104 is tangent to the working rotation direction of the charging barrel 1. The material overturning plates 104 are of trilateral rectangular arch structures and are welded and fixed as well, after the material overturning structures are adopted, material overturning of the first closing-up plate part 1012 and the second closing-up plate part 1013 can be facilitated through the material overturning protrusions, and the material overturning plates 104 can achieve an axial material overturning effect, so that the plastic particles are heated more evenly finally.

Figure 3:
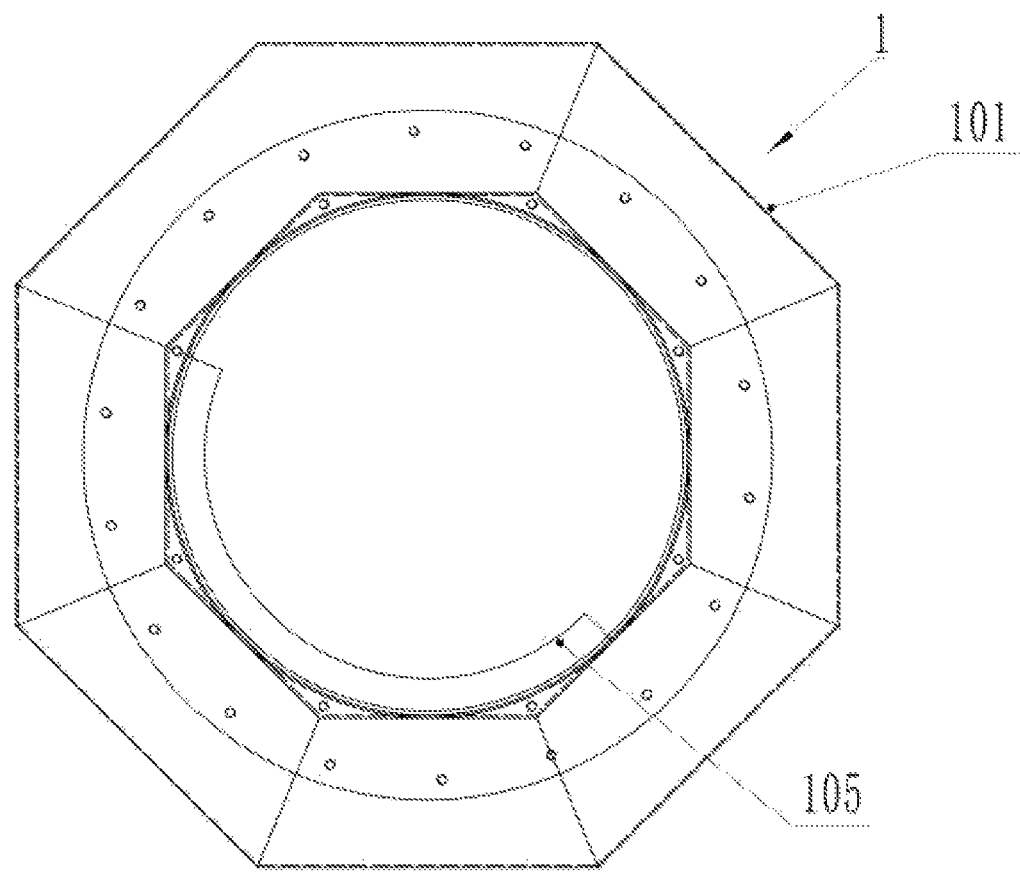
FIG. 3 is an end surface structural schematic diagram of a charging barrel in the second embodiment of the present disclosure.
Figure 4:
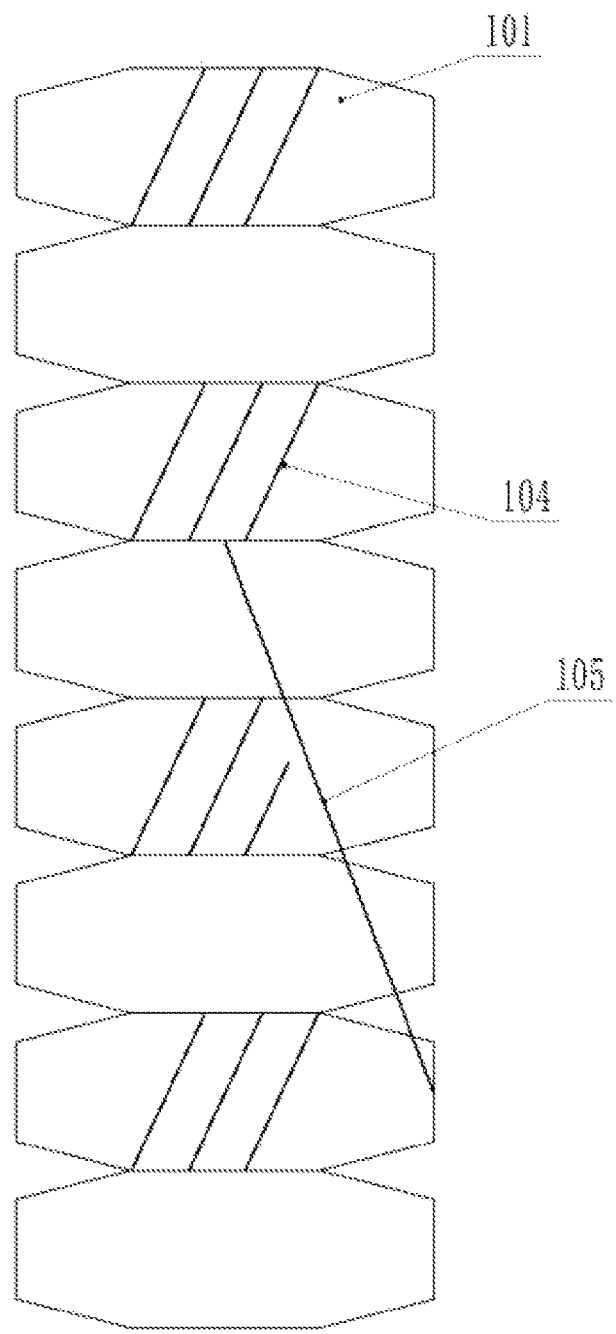
FIG. 4 is an unfolded schematic diagram of a charging barrel.
Figure 5:
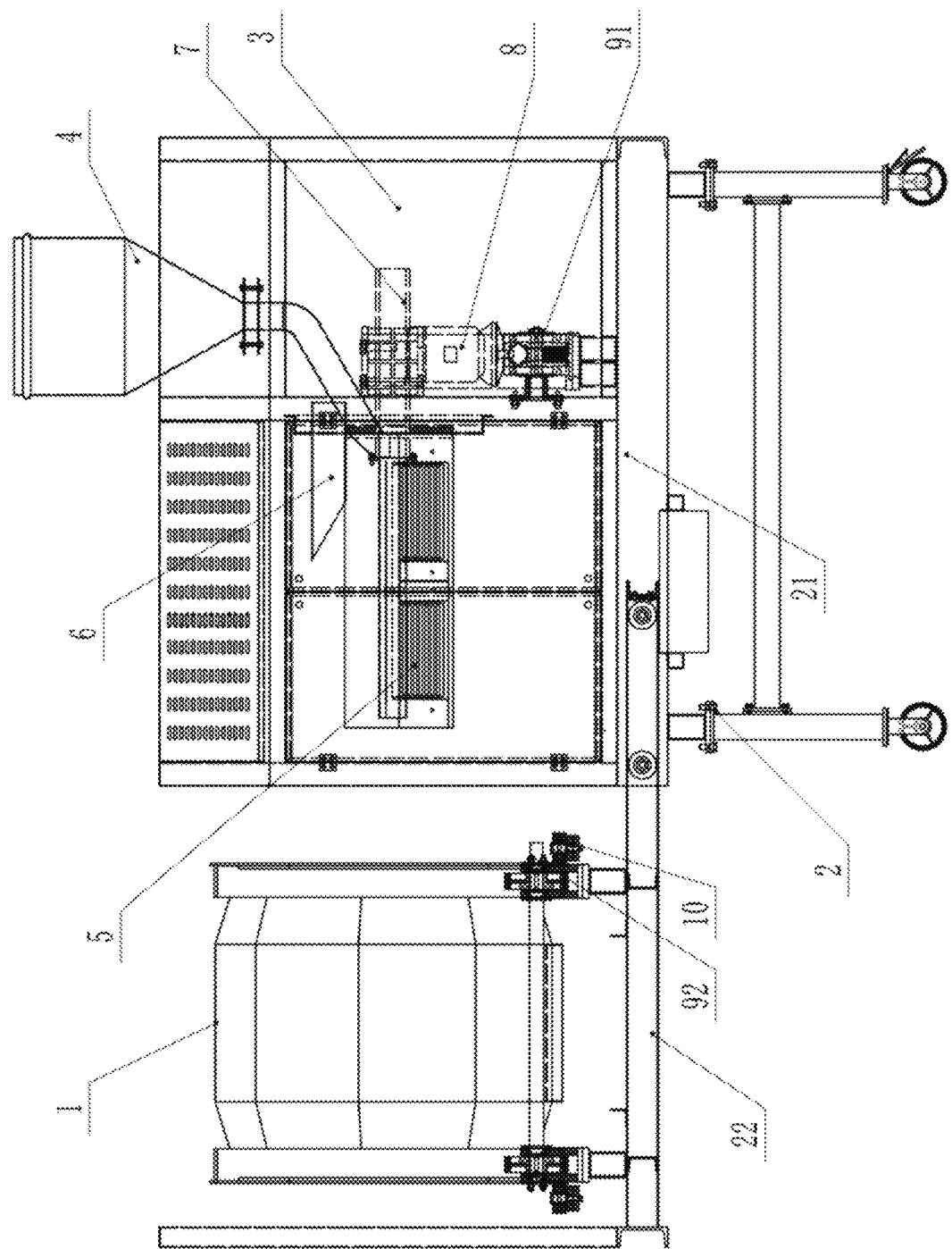
FIG. 5 is a structural schematic diagram of a crystallization and drying all-in-one machine in the second embodiment.
Figure 6:
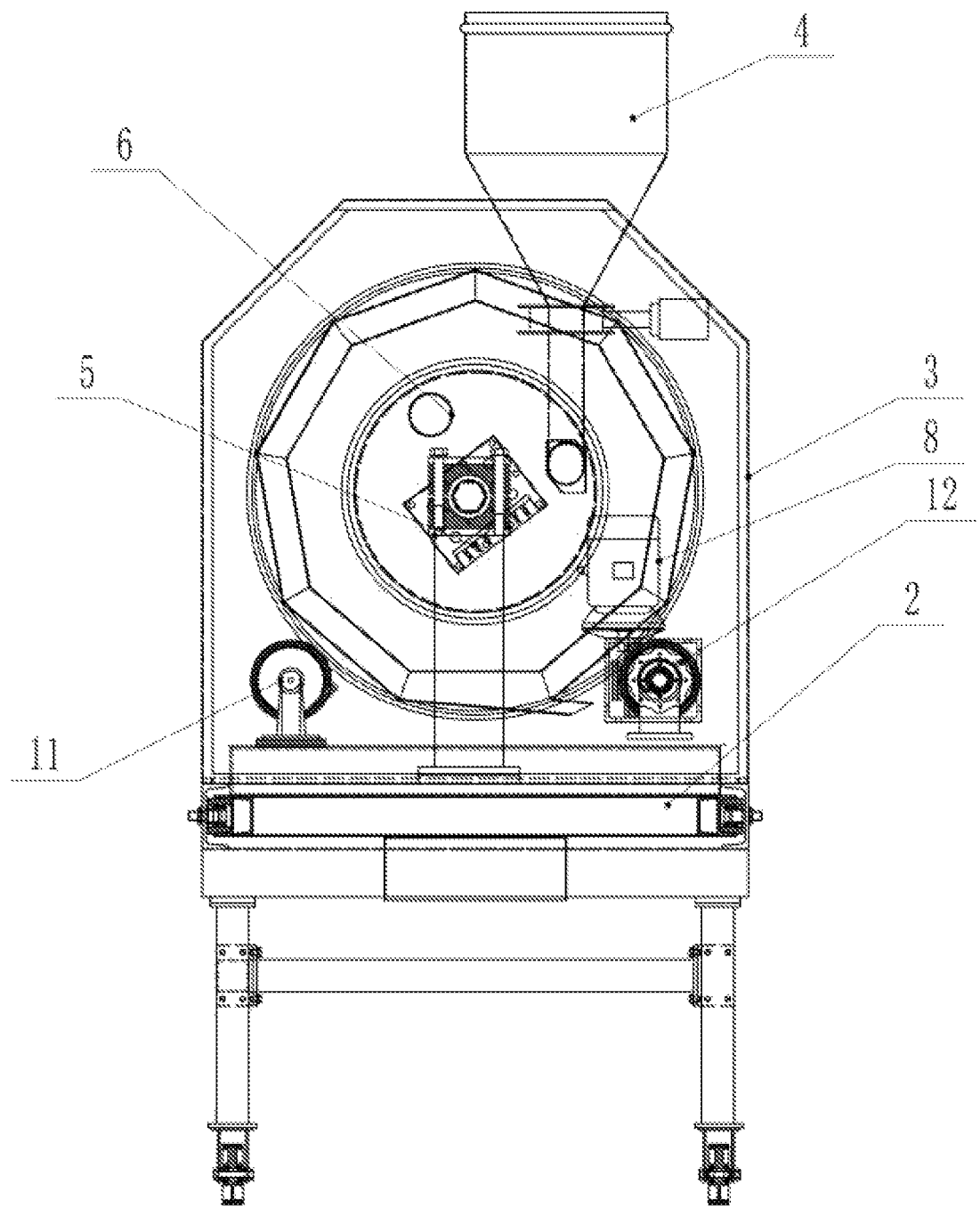
FIG. 6 is a side surface schematic diagram of a crystallization and drying all-in-one machine in the second embodiment.
Figure 7:
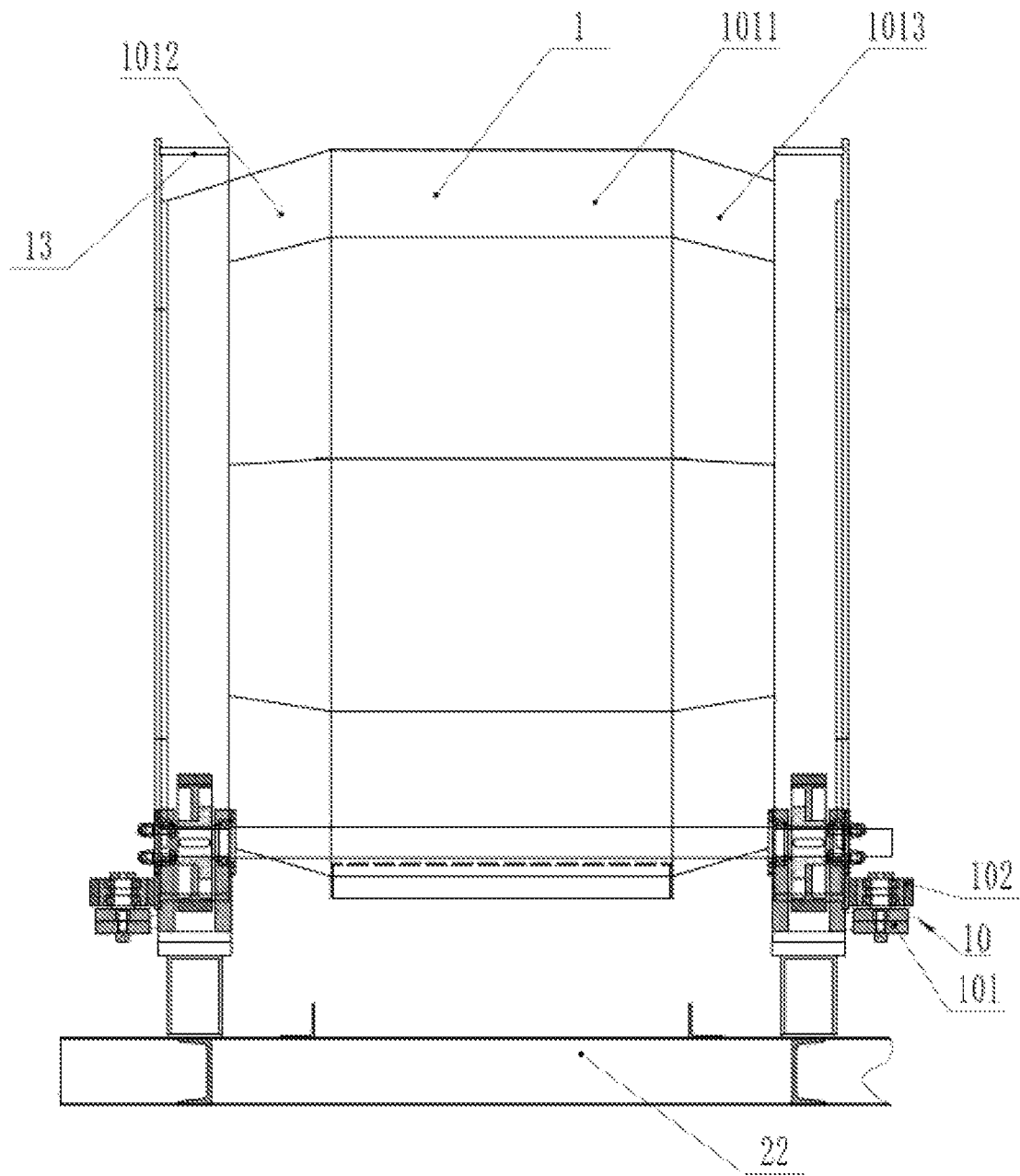
FIG. 7 is a mounting schematic diagram of a charging barrel in the second embodiment.
Figure 8:
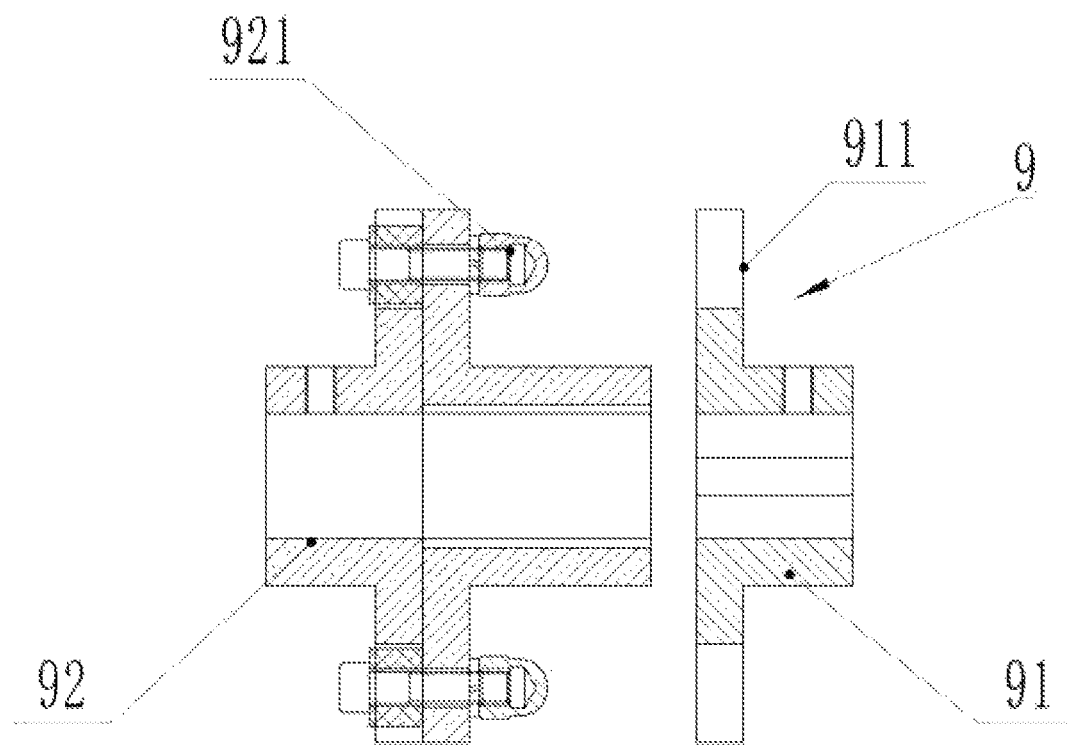
FIG. 8 is a structural section view of a split type coupler in the second embodiment.
Figure 9:
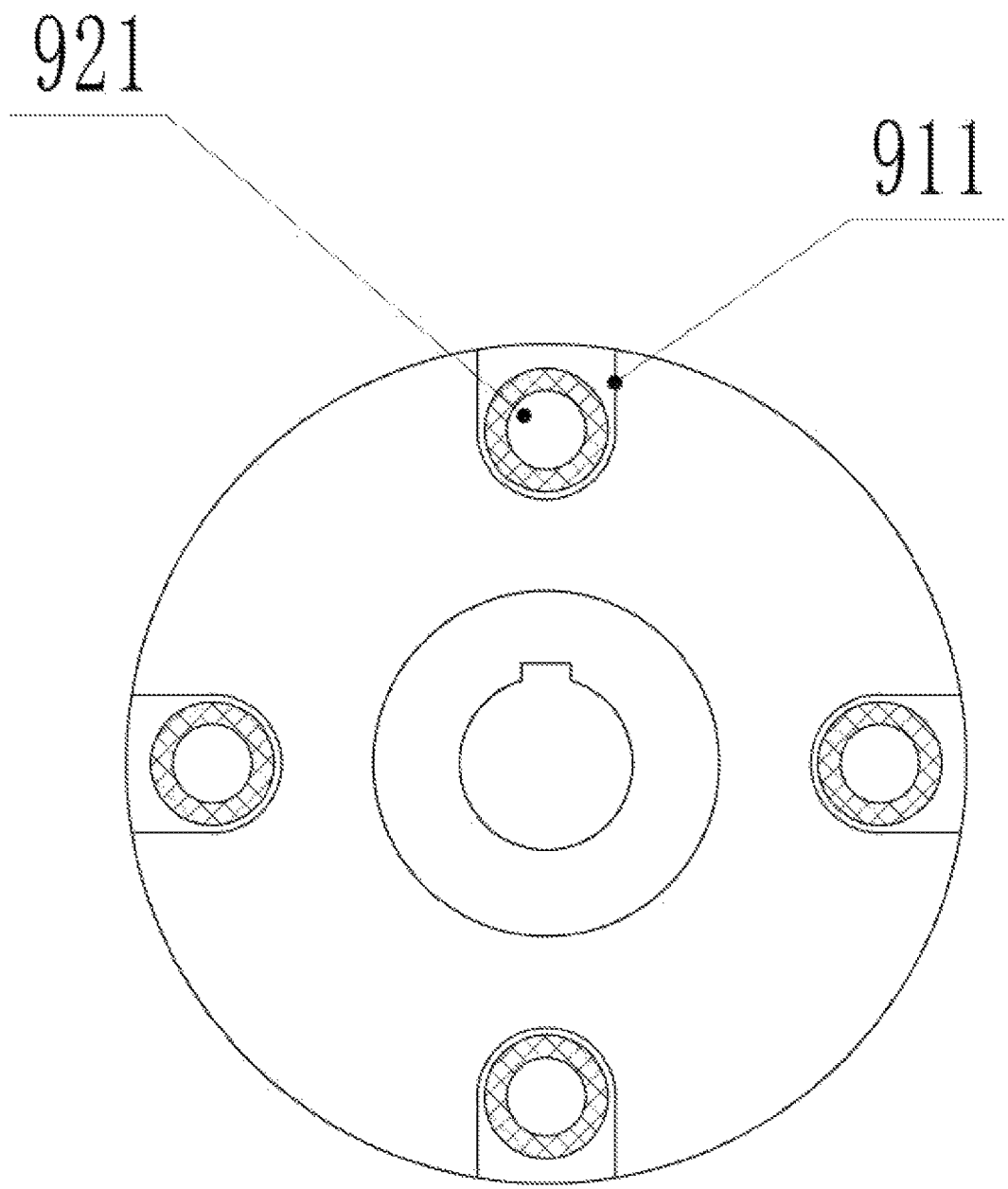
FIG. 9 is a right view of FIG. 8 in the second embodiment.
Figure 10:
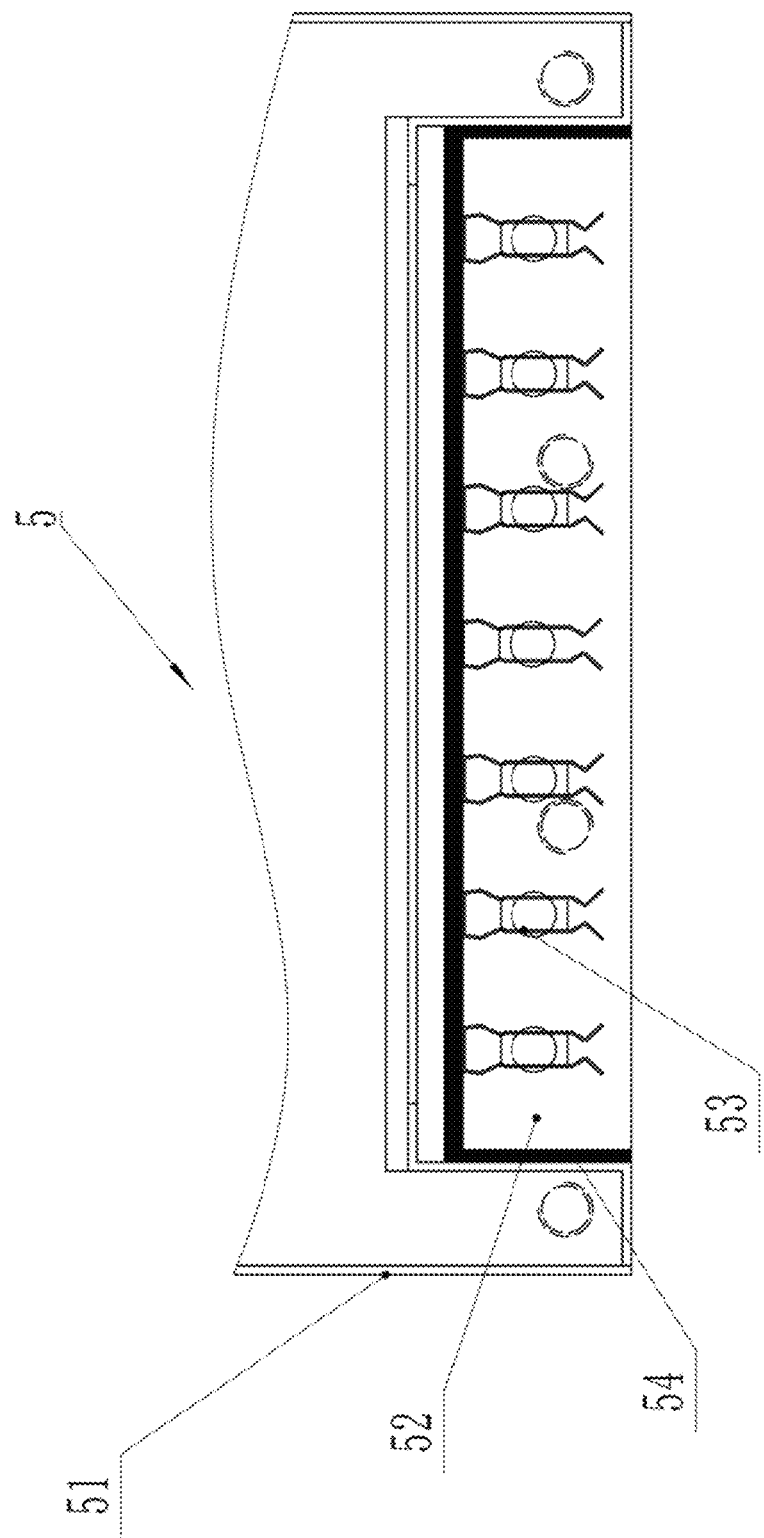
FIG. 10 is a local structural schematic diagram of a lamp box in the second embodiment.
Figure 11:
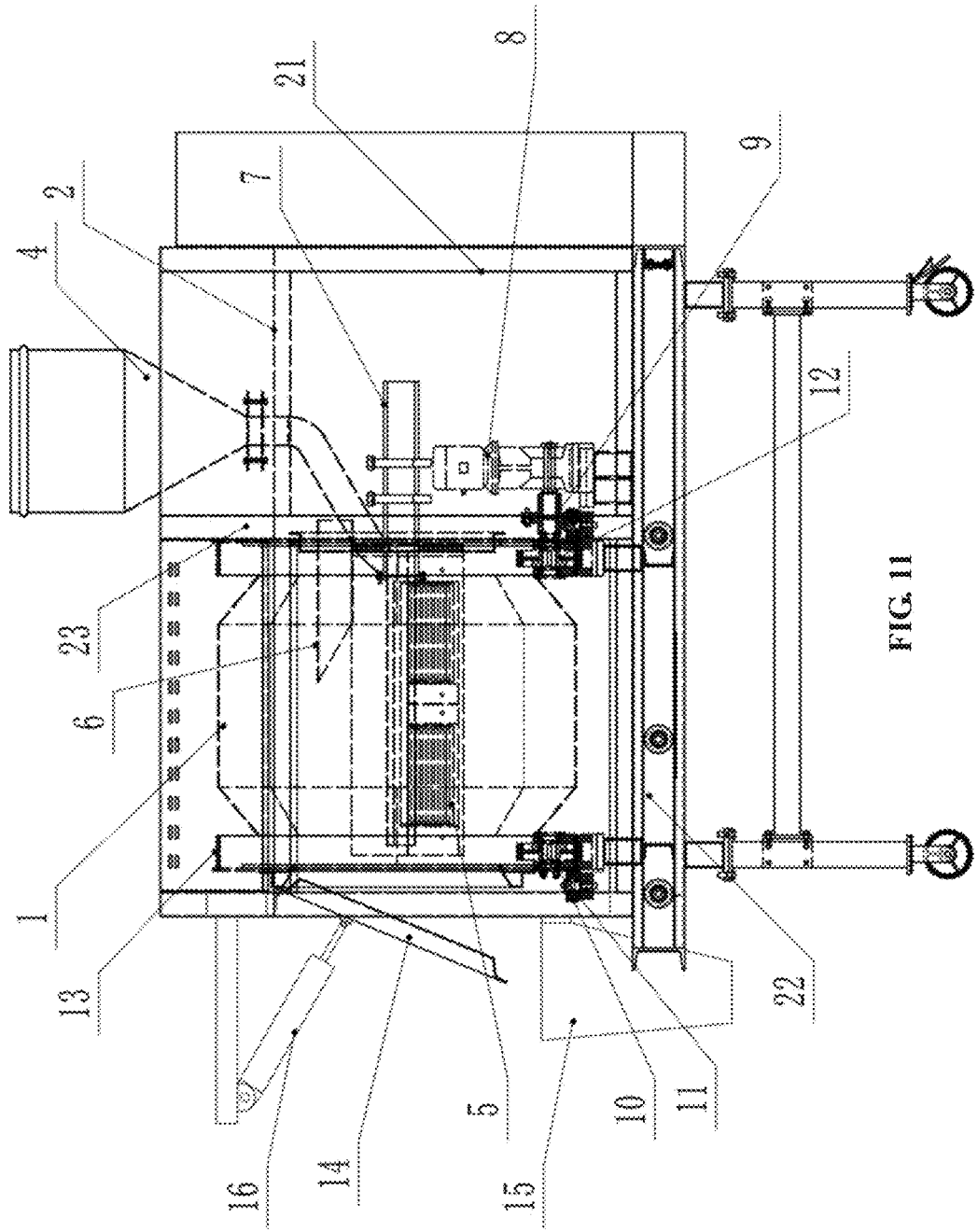
FIG. 11 is a structural schematic diagram of a crystallization and drying all-in-one machine in the third embodiment.
Figure 12:
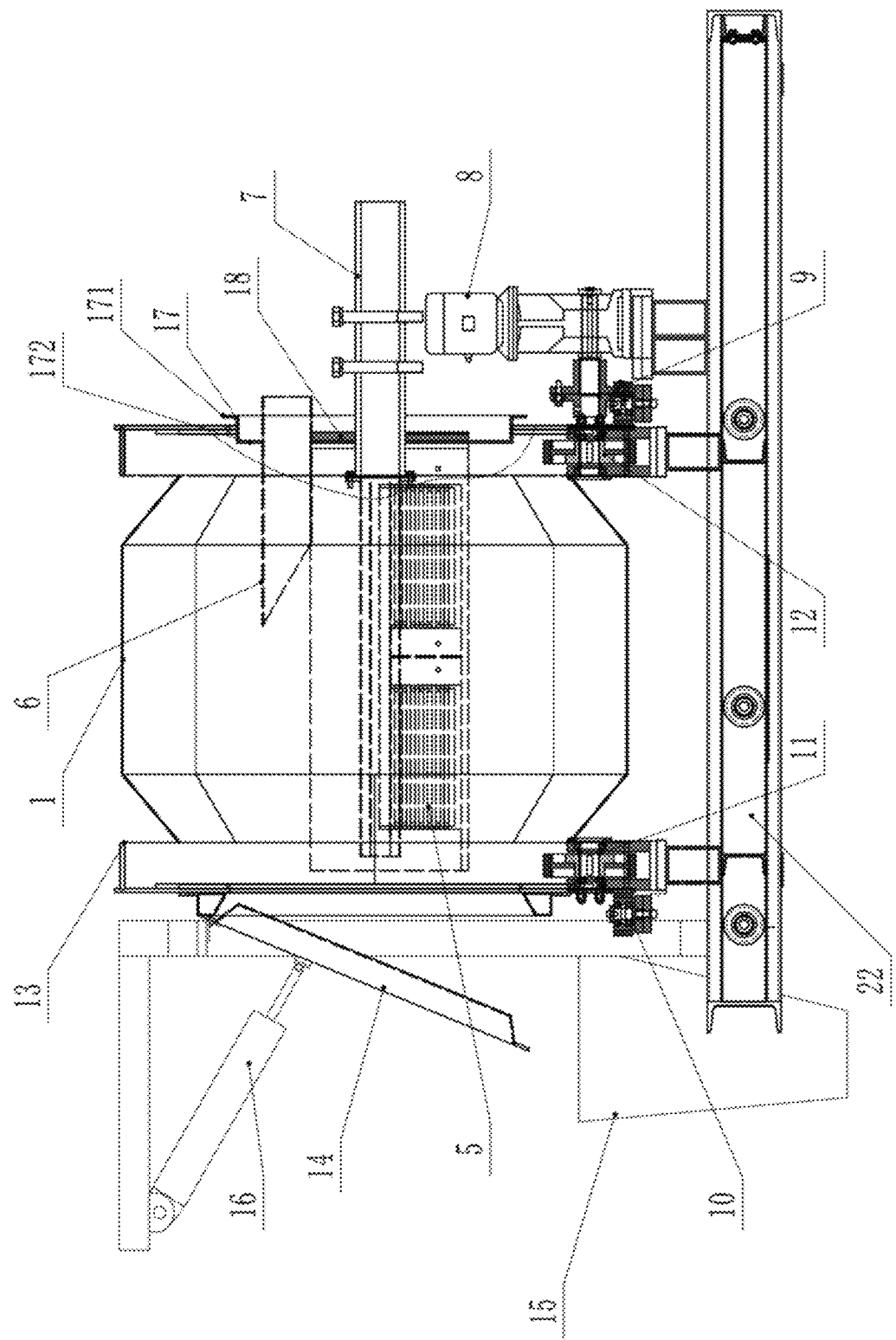
FIG. 12 is a mounting schematic diagram of a charging barrel in the third embodiment.

As shown in FIG. 3 and FIG. 4, the embodiment discloses another charging barrel 1 of an infrared dehumidification, crystallization and drying all-in-one machine, the structure of the charging barrel 1 is similar to that in the first embodiment. However, in the embodiment, the side wall of the charging barrel 1 is not provided with an opening, and an opening in the other end of the charging barrel 1 is set as a discharge hole; and at the moment, a spiral discharging guide plate 105 facilitating discharging of materials is arranged in the charging barrel 1. However, in the embodiment, in order to improve the discharging speed, materials can be discharged more thoroughly, and residues are avoided. In the embodiment, the material overturning structures comprise a plurality of groups of material overturning plates 104 arranged in parallel, the plate surface of the material overturning plate 104 is intersected with the center line of the charging barrel to form an intersection angle, and each group of material overturning plates are arranged on the middle plate part 1011. Moreover, preferably, in the plate surfaces 101 forming the charging barrel 1, a group of material overturning plates 104 are arranged at an interval of one plate surface 101, one end of the spiral discharging guide plate 105 is positioned in the charging barrel 1 and is connected with one group of material overturning plates 104, and the other end of the spiral discharging guide plate 105 spirally extends to the discharge hole, so that in the material overturning process of the charging barrel 1, the rotation direction of the spiral discharging guide plate 105 is not the discharging rotation direction, and the materials cannot be discharged along with the spiral discharging guide plate 105; when the materials need to be discharged, the charging barrel 1 rotates reversely, the materials fall onto the spiral discharging guide plate 105, the material overturning plates accelerate the falling of the materials, and finally, the materials are discharged very quickly and thoroughly without being left on the spiral discharging guide plate 105.

As shown in FIG. 5 to FIG. 10, an infrared dehumidification, crystallization and drying all-in-one machine comprises a machine frame 2 on which a machine shell 3 is fixed, and the charging barrel 1 is rotatably mounted around the central axis on the machine frame 2. The engine base comprises a fixed seat 21 and a sliding seat 22 mounted on the engine base in an axial sliding mode, two pairs of support rollers 11 are mounted on the sliding seat 22, a rotary support structure 13 facilitating rotation of the charging barrel 1 is mounted on the periphery of the charging barrel 1, the charging barrel 1 is rotatably mounted on the support rollers 11 through the rotary support structure 13, the limiting devices 10 are mounted on the sliding seat 22 and limit the axial position of the charging barrel 1. One support roller 11 of the two pairs of support rollers 11 is a driving support roller 12, the motor 8 is fixed to the engine base, and an output shaft of the motor 8 and a wheel shaft of the driving support roller 12 are in transmission connection through a split type coupler 9. In the embodiment, the wheel shafts of the supporting rollers on the same side realize synchronous rotation through a synchronous rotating shaft.

Wherein, the rotary support structures are two support flanges, and the two support flanges are welded to the two ends of the charging barrel 1 respectively. Certainly, the rotary support structures 13 can also be used in other ways, for example, a cylindrical outer support cylinder, inside which the charging barrel 1 is fixed, which is also conveniently rotated.

The limiting device 10 comprises a mounting seat 101 fixed on the sliding seat 22, a limiting roller 102 is mounted on the mounting seat 101, and the limiting devices 10 are mounted at the two ends of the charging barrel 1, so that the charging barrel 1 can be axially limited, and meanwhile, the charging barrel 1 can also be conveniently rotated.

The split type coupler 9 comprises a male coupler 92 and a female coupler 91, wherein the female coupler 91 comprises a coupling plate, and a plurality of grooves 911 are formed in the coupling plate; protrusions 921 corresponding to the grooves 911 are arranged on the coupling plate of the male coupler 92; and therefore, when the protrusions 921 are axially closed up, the protrusions 921 are inserted into the grooves 911 to achieve power transmission.

The charging barrel 1 is driven by a motor 8 to rotate, and a feeding device 4 is mounted on the machine shell 3 and located on the side of a feeding hole of the charging barrel 1. The feeding device 4 comprises a feeding hopper, a vacuum feeding machine can be arranged on the feeding hopper, materials are sucked into the feeding hopper in a negative pressure suction mode, and the feeding hopper is fed into the charging barrel 1 through a feeding channel. A lamp box 5 which extends into the charging barrel 1 from the feeding hole and can emit infrared short waves to heat materials is mounted on the machine frame 2, a fan is further arranged on the machine frame 2, an exhaust pipe 6 which communicates with the charging barrel 1 and is used for exhausting air in the charging barrel 1 is connected to the fan, limiting devices 10 for limiting the axial position of the charging barrel 1 are arranged at the two ends of the charging barrel 1 respectively, and a discharging hole corresponding to the discharge hole 102 in position is formed in the lower part of the machine shell 3.

The lamp box 5 comprises a box body 51, a lamp tube mounting cavity 52 is formed in the bottom of the box body 51, a plurality of lamp tubes 53 are mounted in the lamp tube mounting cavity 52 in an arrayed mode, a heat insulation layer 54 is pasted to the wall of the lamp tube mounting cavity 52, and an air cooling device for conducting air cooling on the lamp tubes 53 is connected to the box body 51. The air cooling device comprises a cooling fan, and the cooling fan extends into the box body 51 through an air cooling air supply pipe 7 to cool the interior of the lamp box 5.

In the embodiment, a partition plate 23 is arranged at the position, close to the feeding end of the charging barrel 1, of the fixed support frame 21. The partition plate 23 is used for partitioning the whole equipment into a heating area and an electrical component mounting area. An end sealing piece 17 and a heat insulation pad 18 are fixed to the partition plate 23. The heat insulation pad 18 is arranged between the box body and the partition plate 23 to achieve a heat insulation effect. The end sealing piece 17 comprises a mounting flange part 171 mounted on the partition plate 23 and a sealing protrusion part 172 protruding towards the charging barrel. The opening in the feeding end of the charging barrel 1 is sleeved on the sealing protrusion part 172 and is matched with the sealing protrusion part in a sealing manner, wherein a heat-resistant silica gel ring can be adopted for sealing in a sealing matching mode, the sealing does not need to be very strict, and plastic particles are mainly prevented from flying out of the feeding end.

The structure of an infrared dehumidification, crystallization and drying all-in-one machine in the embodiment is basically the same as that in the third embodiment. However, the charging barrel 1 in the embodiment is of the structure in the second embodiment. At the moment, an outer cover 14 for blocking the discharge hole is hinged to the machine frame 2. Further, a mounting frame is arranged on the sliding seat 22 and located on the outer side of the charging barrel 1, the outer cover 14 is hinged to the mounting frame, an opening and closing power device for driving the outer cover 14 to be opened and closed is arranged on the machine frame 2, and a guide hopper 15 is arranged below the discharge hole on the machine frame 2. The opening and closing power device is preferably driven by an air cylinder 16, certainly, other linear power devices can be adopted, one end of the air cylinder 16 is hinged to the outer cover 14, the other end of the air cylinder 16 is hinged to the mounting frame, the air cylinder 16 can drive the outer cover 14 to block the discharge hole of the charging barrel 1, but the outer cover 14 does not need to be tightly blocked, so that the charging barrel can rotate conveniently.

Figure 13:
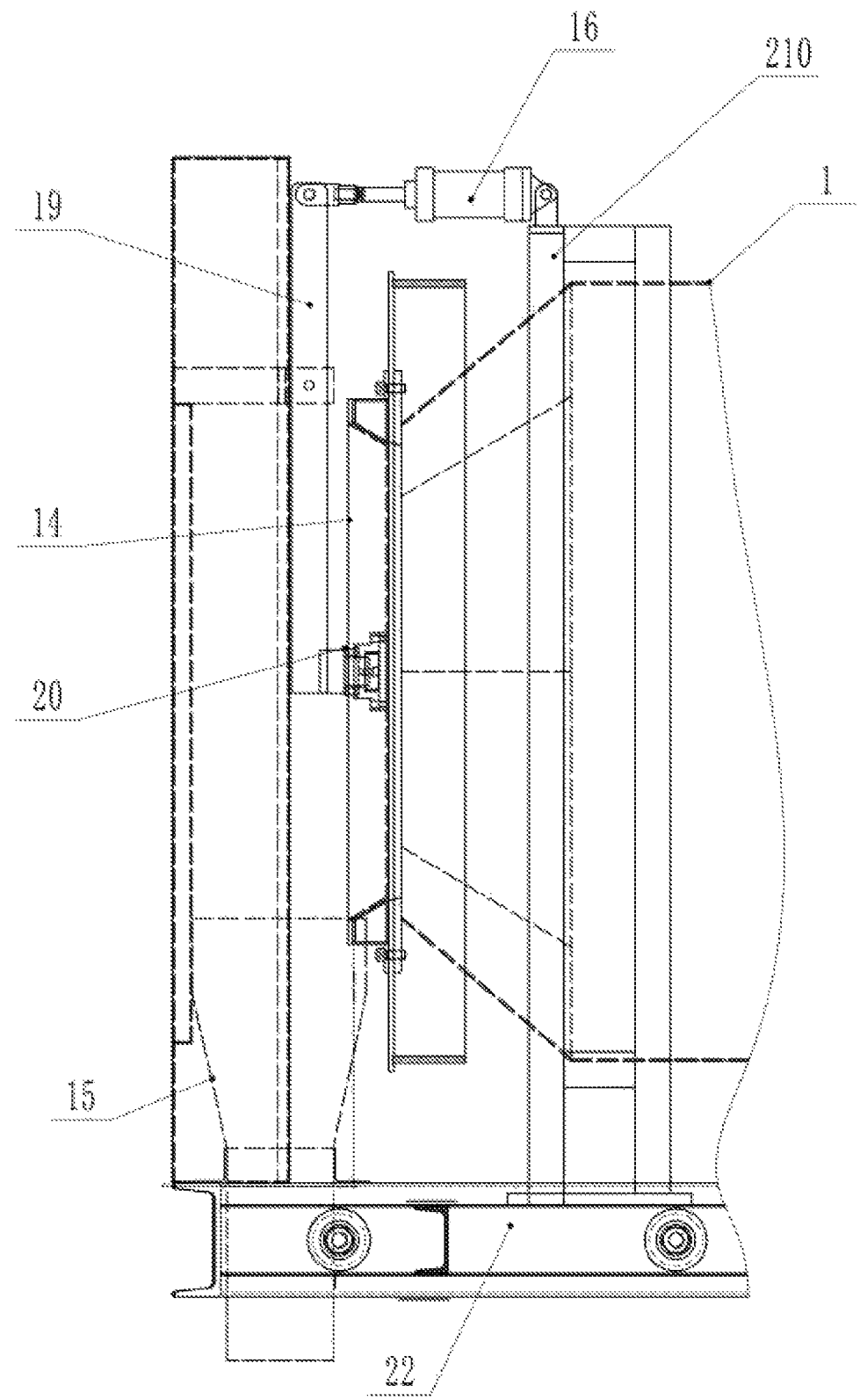
FIG. 13 is a mounting schematic diagram of an outer cover of another structure in the third embodiment.
Figure 14:
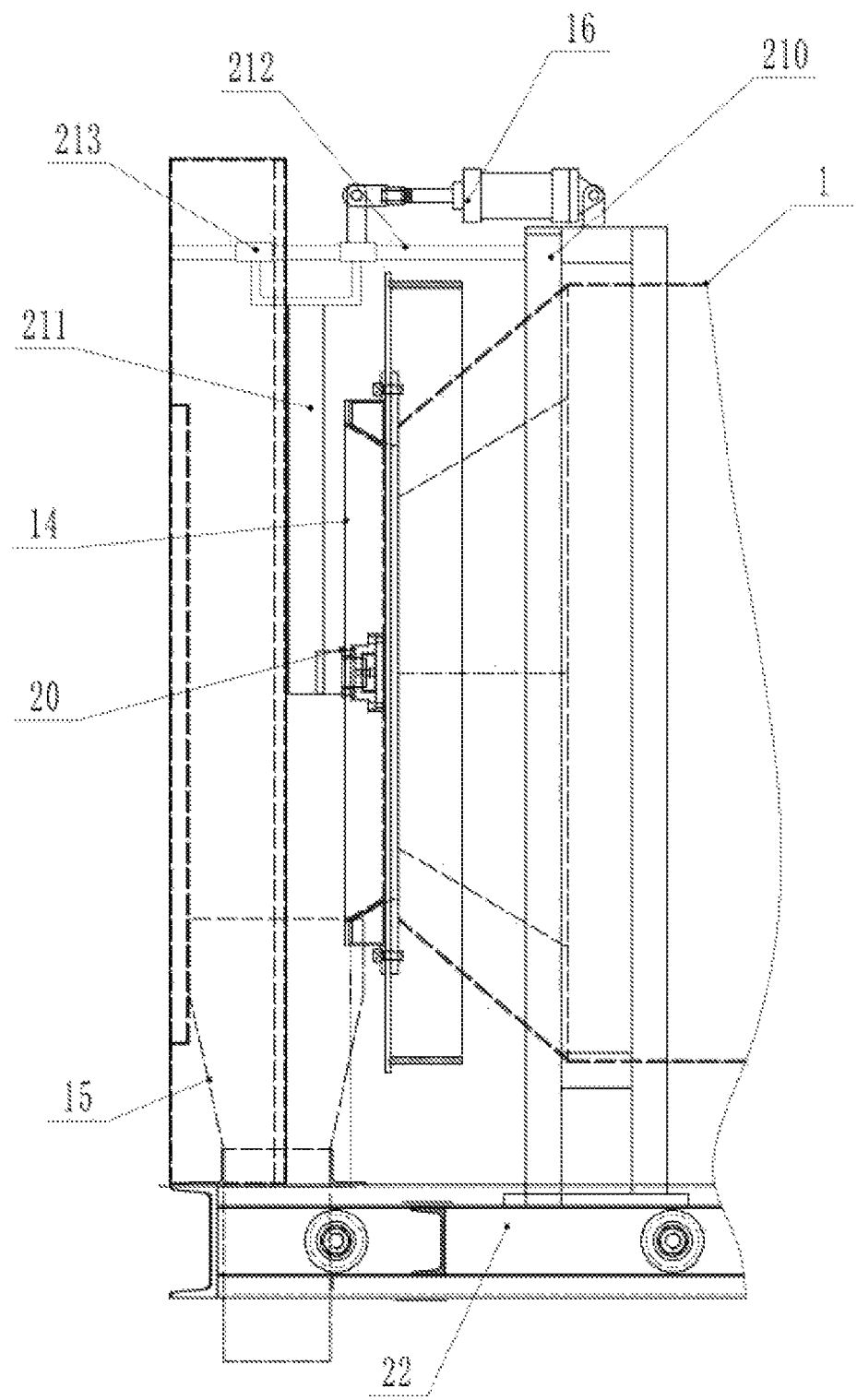
FIG. 14 is a mounting schematic diagram of an outer cover of another structure in the third embodiment.

Certainly, in order to further block the discharge hole better, the mounting of the outer cover 14 is further optimized, as shown in FIG. 13, in the embodiment, the outer cover 14 is driven by the air cylinder 16, a piston rod of the air cylinder 16 is not directly hinged to the outer cover 14 but is driven by an uncovering lever 19, the air cylinder 16 is hinged to an air cylinder support 210, the air cylinder support 210 is a gantry support and fixed to the sliding seat 22, the charging barrel 1 can be just located in the space of the gantry support, the uncovering lever 19 is hinged to an end frame of the discharging end of the sliding seat 22, one end of the uncovering lever 19 is hinged to the piston rod of the air cylinder 16, and the outer cover 14 is mounted at the other end of the uncovering lever 19 through a bearing 20.

In this way, the piston rod of the air cylinder 16 can stretch out and draw back to drive the uncovering lever 19 to deflect to achieve uncovering and closing, the outer cover 14 can rotate, in this way, the air cylinder 16 drives the outer cover 14 to be closed very tightly, and the outer cover 14 can rotate along with the charging barrel 1 after being closed, so that the sealing effect is better, and the phenomenon of material leakage is completely eradicated.

As shown in FIG. 13, another mounting mode of the outer cover is disclosed in FIG. 13, in FIG. 13, the opening and closing mode of the outer cover is an axial movement mode, the opening and closing power device is still preferably an air cylinder, the air cylinder support is fixed to the sliding seat, the air cylinder is mounted on the air cylinder support, and the air cylinder support is also a gantry support. An outer cover support is mounted on the sliding seat in an axial sliding mode, wherein, in the embodiment, a guide rod is fixed to the gantry support and extends in the axial direction. The outer cover support comprises two guide sleeves which are arranged on the guide rod in a sliding and sleeving mode, a supporting rod is connected between the guide sleeves, the outer cover is rotatably mounted on the supporting rod of the outer cover support through a bearing, and the outer cover support is driven by the air cylinder. Therefore, when the air cylinder acts, the outer cover support can be driven to move axially to achieve opening and closing actions, and the outer cover is rotatably mounted on the supporting rod, so that the outer cover can still rotate after being closed, and the phenomenon of material leakage can be completely eradicated.

The infrared dehumidification, crystallization and drying all-in-one machine not only can be used for dehumidifying, crystallizing and drying plastic particles or plastic sheets, but also can be used for drying other flowing materials, for example, grains can be dried and dehumidified. Particularly, the infrared dehumidification, crystallization and drying all-in-one machine in the fourth embodiment can preferably meet the crystallization and drying requirements of high-viscosity plastic particles as raw materials of PET color master batches.

The embodiments described above only describe the preferred manner of the present disclosure and do not limit the scope of the present disclosure, and various modifications and improvements made to the technical solution of the present disclosure within the scope of protection as determined by the claims of the present disclosure without departing from the spirit of the design of the present disclosure.

What is claimed is:

1. A charging barrel of an infrared dehumidification, crystallization and drying all-in-one machine, wherein a cross section of the charging barrel is in a shape of a polygon having six or more sides; an opening is formed in one end, as a feeding end, of the charging barrel; the charging barrel comprises a plurality of plates, each plate of the plurality of plates comprises a middle plate part, as well as a first closing-up plate part and a second closing-up plate part which are arranged at two ends of the middle plate part; the first closing-up plate part and the second closing-up plate part form obtuse angles with the middle plate part and are closed up towards a middle; a discharge hole is formed in a side wall of the charging barrel or an opening in an end opposite the feeding end of the charging barrel is set as a discharge hole; and when the opening in the end opposite the feeding end of the charging barrel is set as the discharge hole, a spiral discharging guide plate facilitating discharging of materials is arranged in the charging barrel.

2. The charging barrel of an infrared dehumidification, crystallization and drying all-in-one machine according to claim 1, wherein the discharge hole in the side wall of the charging barrel is formed in a joint of two adjacent plates of the plurality of plates, and one plate of the two adjacent plates deviates outwards to form the discharge hole.

3. The charging barrel of an infrared dehumidification, crystallization and drying all-in-one machine according to claim 1, wherein an inner wall of the charging barrel is provided with material overturning structures facilitating overturning of plastic particle.

4. The charging barrel of an infrared dehumidification, crystallization and drying all-in-one machine according to claim 2, wherein an inner wall of the charging barrel is provided with material overturning structures facilitating overturning of plastic particle.

5. The charging barrel of an infrared dehumidification, crystallization and drying all-in-one machine according to claim 3, wherein the material overturning structures comprise material overturning protrusions arranged on the first closing-up plate part and the second closing-up plate part.

6. The charging barrel of an infrared dehumidification, crystallization and drying all-in-one machine according to claim 5, wherein the material overturning structures further comprise at least one pair of material overturning plates arranged on the middle plate part, the at least one pair of material overturning plates are arranged in a splayed mode, and an orientation of ends, close to each other, of the at least one pair of material overturning plates is tangent to a working rotation direction of the charging barrel.

7. The charging barrel of an infrared dehumidification, crystallization and drying all-in-one machine according to claim 3, wherein the at least one pair of material overturning structures comprise a plurality of groups of material overturning plates which are arranged in parallel, a plate surface of each of the plurality of groups of material overturning plates is intersected with a center line of the charging barrel to form an intersection angle, and each of the plurality of groups of material overturning plates are arranged on the middle plate part.

8. An infrared dehumidification, crystallization and drying all-in-one machine, comprising a machine frame on which a machine shell is fixed, wherein the charging barrel according to claim 1 is rotatably mounted around a central axis on the machine frame, the charging barrel is driven by a motor to rotate, a feeding device is mounted on the machine shell and located on a side of a feeding hole of the charging barrel, a lamp box which extends into the charging barrel from the feeding hole and is adapted to emit infrared short waves to heat materials is mounted on the machine frame, a fan is further arranged on the machine frame, an exhaust pipe which communicates with the charging barrel and is configured for exhausting air in the charging barrel is connected to the fan, and limiting devices for limiting an axial position of the charging barrel are arranged at two ends of the charging barrel respectively;

when the discharge hole is formed in the side wall of the charging barrel, the machine shell comprises a discharging hole in a lower part of the machine shell, and a position of the discharging hole corresponds to a position of the discharge hole; and when the opening in the end opposite the feeding end of the charging barrel is the discharge hole, an outer cover for blocking the discharge hole is hinged to the machine frame, an opening and closing power device for driving the outer cover to be opened and closed is arranged on the machine frame, and a guide hopper is arranged below the discharge hole on the machine frame.

9. The infrared dehumidification, crystallization and drying all-in-one machine according to claim 8, wherein the machine frame comprises a fixed support frame and a sliding seat mounted on the fixed support frame in an axial sliding mode, two pairs of support rollers are mounted on the sliding seat, rotary support structures facilitating rotation of the charging barrel are mounted on a periphery of the charging barrel, the charging barrel is rotatably mounted on the two pairs of support rollers through the rotary support structures, the limiting devices are mounted on the sliding seat and limit the axial position of the charging barrel, one support roller of the two pairs of support rollers is a driving support roller, the motor is fixed to the fixed support frame, an output shaft of the motor and a wheel shaft of the driving support roller are in transmission connection through a split type coupler, and the guide hopper is fixed on the sliding seat.

10. The infrared dehumidification, crystallization and drying all-in-one machine according to claim 9, wherein the lamp box comprises a box body, a lamp tube mounting cavity is formed in a bottom of the box body, a plurality of lamp tubes are mounted in the lamp tube mounting cavity in an arrayed mode, a heat insulation layer is pasted to the wall of the lamp tube mounting cavity, and an air cooling device for conducting air cooling on the lamp tubes is connected to the box body.

11. The infrared dehumidification, crystallization and drying all-in-one machine according to claim 10, wherein a partition plate is arranged at a position, close to a feeding end of the charging barrel, of the fixed support frame, an end sealing piece and a heat insulation pad are fixed to the partition plate, the heat insulation pad is arranged between the box body and the partition plate, the end sealing piece comprises a mounting flange part mounted on the partition plate and a sealing protrusion part protruding towards the charging barrel, and the opening in the feeding end of the charging barrel is sleeved on the sealing protrusion part and is matched with the sealing protrusion part in a sealing manner.

12. The infrared dehumidification, crystallization and drying all-in-one machine according to claim 9, wherein the opening and closing power device is an air cylinder, an air cylinder support is fixed to the sliding seat, the air cylinder is hinged to the air cylinder support, an end frame is arranged at a discharging end, close to the charging barrel, of the sliding seat, a middle of an uncovering lever is hinged to the end frame, one end of the uncovering lever is hinged to a piston cylinder of the air cylinder, and the outer cover is rotatably mounted at an other end of the uncovering lever through a bearing.

13. The infrared dehumidification, crystallization and drying all-in-one machine according to claim 9, wherein the opening and closing power device is an air cylinder, an air cylinder support is fixed to the sliding seat, the air cylinder is mounted on the air cylinder support, an outer cover support is mounted on the sliding seat in an axial sliding mode, the outer cover is rotatably mounted on the outer cover support through a bearing, and the outer cover support is driven by the air cylinder.

* * * * *